(12) United States Patent
Zhang

(10) Patent No.: US 11,250,547 B2
(45) Date of Patent: Feb. 15, 2022

(54) FACIAL IMAGE ENHANCEMENT METHOD, DEVICE AND ELECTRONIC DEVICE

(71) Applicant: Beijing Xiaomi Intelligent Technology Co., Ltd., Beijing (CN)

(72) Inventor: Liang Zhang, Beijing (CN)

(73) Assignee: Beijing Xiaomi Intelligent Technology Co., Ltd., Beijing (CN)

(*) Notice: Subject to any disclaimer, the term of this patent is extended or adjusted under 35 U.S.C. 154(b) by 72 days.

(21) Appl. No.: 16/816,930

(22) Filed: Mar. 12, 2020

(65) Prior Publication Data

US 2021/0125311 A1    Apr. 29, 2021

(30) Foreign Application Priority Data

Oct. 24, 2019  (CN) .......................... 201911019722.0

(51) Int. Cl.
*G06T 5/00* (2006.01)
*G06K 9/00* (2022.01)
*G06T 5/50* (2006.01)

(52) U.S. Cl.
CPC .......... *G06T 5/002* (2013.01); *G06K 9/00255* (2013.01); *G06T 5/50* (2013.01);
(Continued)

(58) Field of Classification Search
CPC .......... G06T 5/002; G06T 5/50; G06T 5/001; G06T 5/005; G06T 5/20; G06T 5/00; G06T 5/004; G06T 5/008; G06T 5/006; G06T 5/003; G06T 2207/20221; G06T 2207/30201; G06T 2207/20012;
(Continued)

(56) References Cited

U.S. PATENT DOCUMENTS 10,096,089 B2   10/2018  Kopysov
11,030,799 B2*   6/2021  Nakada ................... G06T 15/80
(Continued)

FOREIGN PATENT DOCUMENTS

CN     101652784 A    2/2010
CN     105096280 A   11/2015
(Continued)

OTHER PUBLICATIONS

Chen, X. et al., Face illumination transfer through edge-preserving filters, CVPR, IEEE Computer Society Conference on Computer Vision and Pattern Recognition, Jun. 2011, 8 pages.
(Continued)

*Primary Examiner* — Jose L Couso
(74) *Attorney, Agent, or Firm* — Finnegan, Henderson, Farabow, Garrett & Dunner, L.L.P.

(57) ABSTRACT

A facial image enhancement method includes: determining a plurality of feature regions in a facial image according to feature points of the facial image; correcting an initial enhancement weight coefficient of each feature region of the feature regions and obtaining a weight map of discrete enhancement on the facial image; obtaining a weight map of continuous enhancement on the facial image according to the weight map of discrete enhancement on the facial image; and performing enhancing the facial image according to the weight map of continuous enhancement on the facial image to obtain an enhanced facial image.

15 Claims, 10 Drawing Sheets

(52) U.S. Cl.
CPC ............... *G06T 2207/20221* (2013.01); *G06T 2207/30201* (2013.01)

(58) Field of Classification Search
CPC . G06T 2207/10024; G06T 2207/20192; G06T 2207/20024; G06T 2207/20112; G06T 2207/20182; G06T 2207/10004; G06T 2207/20124; G06T 2207/30216; G06T 2207/20084; G06T 2207/10016; G06T 11/60; G06T 11/001; G06T 11/40; G06T 11/00; G06T 7/40; G06T 7/11; G06T 7/251; G06T 15/04; G06K 9/00255; G06K 9/40; G06K 9/44; G06K 9/00281; G06K 9/00234; G06K 9/00221; G06K 9/00248; G06K 9/00228; G06K 9/0061; G06K 9/00268; G06K 9/00288; G06K 9/036; G06K 9/6201; G06K 9/6255; G06K 2009/00322; H04N 1/628; H04N 1/622; H04N 1/409; H04N 1/62; H04N 5/23219; H04N 5/23229; H04N 5/2621; H04N 2101/00; H04N 2005/2726; G07C 9/37; G07C 9/00563

See application file for complete search history.

(56) References Cited

U.S. PATENT DOCUMENTS

| | | | | |
|---|---|---|---|---|
| 2004/0170337 | A1* | 9/2004 | Simon | G06T 11/00 382/254 |
| 2010/0026831 | A1* | 2/2010 | Ciuc | G06K 9/00221 348/222.1 |
| 2011/0026818 | A1* | 2/2011 | Yen | H04N 5/202 382/165 |
| 2014/0369554 | A1 | 12/2014 | Albuz et al. | |
| 2016/0335745 | A1* | 11/2016 | Tajima | G06T 5/008 |
| 2017/0154437 | A1 | 6/2017 | Sato | |
| 2017/0243396 | A1* | 8/2017 | Kim | G06K 9/00248 |
| 2017/0339409 | A1* | 11/2017 | Socek | H04N 19/167 |
| 2018/0189932 | A1 | 7/2018 | Kopysov | |
| 2019/0311464 | A1* | 10/2019 | Chuang | H04N 1/6077 |
| 2020/0005435 | A1* | 1/2020 | Tajima | H04N 5/2621 |
| 2020/0020152 | A1* | 1/2020 | Nakada | G06T 5/002 |

FOREIGN PATENT DOCUMENTS

| | | |
|---|---|---|
| CN | 105530434 A | 4/2016 |
| CN | 105761214 A | 7/2016 |
| CN | 107392866 A | 11/2017 |
| CN | 108648163 A | 10/2018 |
| CN | 109146823 A | 1/2019 |
| EP | 1 453 002 A2 | 9/2004 |
| JP | 2004005660 A | 1/2004 |
| JP | 2006113658 A | 4/2006 |
| JP | 2007280291 A | 10/2007 |
| JP | 2012098861 A | 5/2012 |
| JP | 2016086350 A | 5/2016 |
| JP | 2017220078 A | 12/2017 |
| WO | WO 2009/036554 A1 | 3/2009 |

OTHER PUBLICATIONS

Extended European Search Report in European Application No. 20166227.7, dated Sep. 22, 2020.
He, K. et al., *Fast Guided Filter*, Microsoft, May 5, 2015, 2 pgs.
Office Action of Japanese Application No. 2020-004082, dated Mar. 19, 2021.
First Office Action in Chinese Application No. 201911019722.0, from China National Intellectual Property Administration, dated Dec. 17, 2021.
Zhu, Haoran Z. et al., "Infrared and Visible Image Fusion Based on Contract Enhancement and Multi-scale Edge-preserving Decomposition", Journal of Electronics & Information Technology, Jun. 30, 2018, 8 pages.

* cited by examiner

FACIAL IMAGE ENHANCEMENT METHOD, DEVICE AND ELECTRONIC DEVICE

CROSS-REFERENCE TO RELATED APPLICATION

This application is based upon and claims priority to Chinese Patent Application No. 201911019722.0, filed on Oct. 24, 2019, the entire content of which is incorporated herein by reference.

TECHNICAL FIELD

The present disclosure relates to the field of image processing and, particularly, to a facial image enhancement method, device and electronic device.

BACKGROUND

At present, users are pursuing high-definition images when taking pictures with electronic devices, and especially when shooting facial images. For example, a user may want to obtain effects of lighting, clear facial contours, and no impurities on face shown in the image. However, when image processing is performed on images collected by a traditional camera module, normally, an entire facial image is directly enhanced. Therefore, impurities in originally smooth regions of the face are often also enhanced, resulting in degraded picture quality. In addition, because different users have different facial skin states, if a same enhancement method is used for enhancement, it may not be able to adapt to each user's own facial features and thus not satisfy the user's needs.

SUMMARY

According to a first aspect of embodiments of the present disclosure, a facial image enhancement method includes: determining a plurality of feature regions in a facial image according to feature points of the facial image; correcting an initial enhancement weight coefficient of each feature region of the feature regions, to obtain a weight map of discrete enhancement on the facial image; obtaining a weight map of continuous enhancement on the facial image according to the weight map of discrete enhancement on the facial image; and performing enhancing the facial image according to the weight map of continuous enhancement on the facial image to obtain an enhanced facial image.

According to a second aspect of embodiments of the present disclosure, a facial image enhancement device includes: a processor; and a memory storing instructions executable by the processor, wherein the processor is configured to: determine a plurality of feature regions in a facial image according to feature points of the facial image; correct an initial enhancement weight coefficient of each feature region of the feature regions to obtain a weight map of discrete enhancement on the facial image; obtain a weight map of continuous enhancement on the facial image corresponding to the facial image according to the weight map of discrete enhancement on the facial image; and perform enhancing the facial image according to the weight map of continuous enhancement on the facial image, to obtain an enhanced facial image.

According to a third aspect of embodiments of the present disclosure, a non-transitory computer-readable storage medium has stored thereon instructions that, when executed by a processor of a device, cause the device to perform a facial image enhancement method including: determining a plurality of feature regions in a facial image according to feature points of the facial image; correcting an initial enhancement weight coefficient of each feature region of the feature regions, to obtain a weight map of discrete enhancement on the facial image; obtaining a weight map of continuous enhancement on the facial image according to the weight map of discrete enhancement on the facial image; and performing enhancing the facial image according to the weight map of continuous enhancement on the facial image to obtain an enhanced facial image.

The technical solutions provided by embodiments of the present disclosure may include the following beneficial effects.

In embodiments of the disclosure, different weights may be configured for different feature regions of a facial image, thus different degrees of enhancement may be performed for different regions of a face, which allows enhancement to be performed in regions with more impurities while avoiding original smooth regions being over-enhanced, which is beneficial to improving image quality of the facial image.

It should be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain principles of the present disclosure.

DETAILED DESCRIPTION

Exemplary embodiments will be illustrated in detail here, examples of which are illustrated in accompanying drawings. When the following description refers to the accompanying drawings, the same numbers in different drawings represent the same or similar elements unless otherwise indicated. The implementations described in the following exemplary embodiments do not represent all implementations consistent with the disclosure. Instead, they are merely examples of devices and methods consistent with aspects of the disclosure as recited in the appended claims.

The terminology used in the disclosure is for a purpose of describing particular embodiments only and is not intended to limit the disclosure. As used in the disclosure and appended claims, singular forms "a" "the said" and "the" are intended to include plural forms as well, unless the context clearly indicates otherwise. It should also be understood that the term "and/or" as used herein refers to and includes any or all possible combinations of one or more of the associated listed items.

It should be understood that although terms such as first, second, third, etc. may be used in the disclosure to describe various information, such information should not be limited to these terms. These terms are only used to distinguish the same type of information from each other. For example, without departing from the scope of the present disclosure, the first information may also be referred to as the second information, and similarly, the second information may also be referred to as the first information. Depending on the context, the word "if" as used herein may be interpreted as "at" or "when" or "in response to determination".

Figure 1:
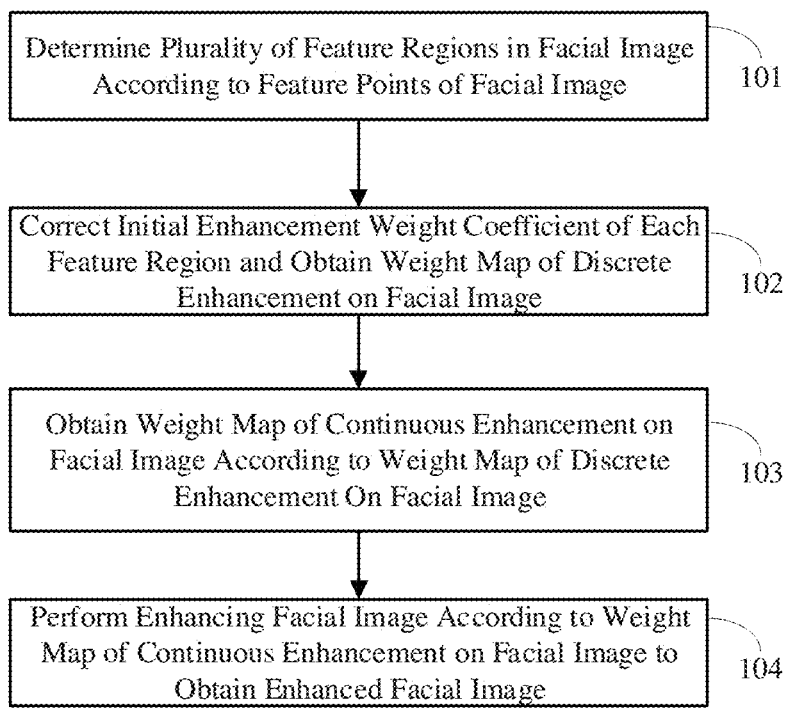
FIG. 1 is a flowchart showing a facial image enhancement method according to an exemplary embodiment.

FIG. 1 is a flowchart showing a facial image enhancement method according to an exemplary embodiment. For example, the method is used in a terminal, and may include the following operations.

In operation S101, a plurality of feature regions in a facial image is determined according to feature points of the facial image.

In the embodiment, facial images collected by a camera of the terminal may be obtained, and then face alignment may be performed based on a convolutional neural network (CNN) to obtain key feature points of the face. For example, multiple contour points of those such as eyes, nose, eyebrows, mouth, and face may be determined as key feature points, and a plurality of corresponding feature regions may be obtained based on a plurality of obtained key feature points. The feature regions may include feature regions such as an eyebrow region, a mouth region, a nose region, a cheek region, an eye region and a face contour. The face alignment may be performed based on an algorithm including an edge-aware face alignment algorithm, which uses edges as a geometric structure of a face to locate facial feature points. In addition to the edge-aware face alignment algorithm, other face alignment algorithms may also be used to obtain a plurality of feature regions. For example, a 3D face algorithm or a 3D dense face alignment algorithm may be used, which is not limited in the present disclosure.

In operation S102, an initial enhancement weight coefficient of each feature region is corrected and a weight map of discrete enhancement on the facial image is obtained.

In the embodiment, the initial enhancement weight coefficient may be a fixed weight coefficient for each feature region obtained according to a result of machine learning. Because different users have different facial conditions, for example, some users have smooth foreheads, while others have more acne on their forehead region, when forehead regions for these two different types of users are enhanced, enhancement intensity should also be changed accordingly, so as to avoid that an originally smooth region of the forehead is over-enhanced. Therefore, in the embodiment, the initial enhancement weight coefficients may be corrected to obtain different enhancement weights that are suitable for each feature region, and by integrating the enhancement weights in each region, the weight map of discrete enhancement on the facial image may be obtained.

In an embodiment, for the correction of the initial enhancement weight coefficient, the following methods may be adopted: first, after each feature region is obtained, an initial enhancement weight coefficient corresponding to the each feature region is obtained, then a smoothing coefficient of the each feature region and a physiological feature coefficient corresponding to the facial image are determined, and then the initial enhancement weight coefficient is corrected according to the smoothing coefficient of the each feature region and physiological feature coefficient, and the weight map of discrete enhancement on the facial image is obtained according to the corrected enhancement weights.

Because there are differences in facial impurity condition between older and younger users, the physiological feature coefficients may include age coefficients; and facial impurity conditions also differ when genders are different, so the physiological feature coefficients may include gender coefficients. In some embodiments, the physiological feature coefficient may include an age coefficient and a gender coefficient. The smoothing coefficient may be used to characterize impurities in various feature regions of the face. For example, the smoothing coefficient may be obtained in the following ways: a variance and an average value for pixel values of a plurality of pixels in each feature region are obtained, and then the smoothing coefficient is determined according to the variance or the average value, or the smoothing coefficient is determined according to the variance and the average value, which is not limited in the disclosure.

In operation S103, a weight map of continuous enhancement on the facial image is obtained according to the weight map of discrete enhancement on the facial image.

In the embodiment, an original grayscale image corresponding to an original image may be obtained according to the original image in RGB color space, and then a weight map of continuous enhancement on the facial image is determined according to a steering map filtering algorithm. The original grayscale image corresponding to the facial image is used as a guide image in the guided image filtering algorithm, and the weight map of discrete enhancement on the facial image is used as an input image in the guided image filtering algorithm.

In operation S104, enhancing the facial image is performed according to the weight map of continuous enhancement on the facial image to obtain an enhanced facial image.

In the embodiment, the original grayscale image may be enhanced via the image enhancement algorithm and the enhanced grayscale image is obtained. A fused grayscale image may be obtained based on a continuous blur amount map, the original grayscale image, and the enhanced grayscale image, and the fused grayscale image is converted into one in the RGB color space, and the enhanced facial image may be obtained after performing enhancement processing. Since the enhanced grayscale image and the original grayscale image are fused according to a weight of each pixel, over-enhancing on smooth regions in the original image may be avoided, and impurities in the smooth regions may be prevented from being excessively enlarged.

The image enhancement algorithm may include one or more types of a high contrast preservation algorithm, a logarithmic image enhancement algorithm, an exponential image enhancement algorithm, a Laplacian operator image enhancement algorithm, and a gamma transform algorithm, which is not limited in the present disclosure. In an embodiment, the fused grayscale image may be obtained based on the continuous blur amount map, the original grayscale image, and the enhanced grayscale image via the following algorithm:

$$Y\_C_{(i,j)} = M_{(i,j)} * Y\_B_{(i,j)} + (1 - M_{(i,j)}) * Y\_A_{(i,j)}; \quad \text{equation (1)}$$

where $Y\_C_{(i,j)}$ is a fused grayscale image of a pixel located at (i, j), $M_{(i,j)}$ is an out-of-focus weight of a pixel located at (i, j) according to the weight map of continuous enhancement on the facial image. $Y\_B_{(i,j)}$ is an enhanced grayscale image of a pixel located at (i, j), and $Y\_A_{(i,j)}$ is an original grayscale image of a pixel located at (i, j).

In the above embodiments, different weights may be configured for different feature regions of the facial image, thus different degrees of enhancement may be performed for different regions of a face, which allows enhancement being performed in regions with more impurities while avoiding original smooth regions being over-enhanced, which is beneficial to improving image quality of the facial image.

Figure 2:
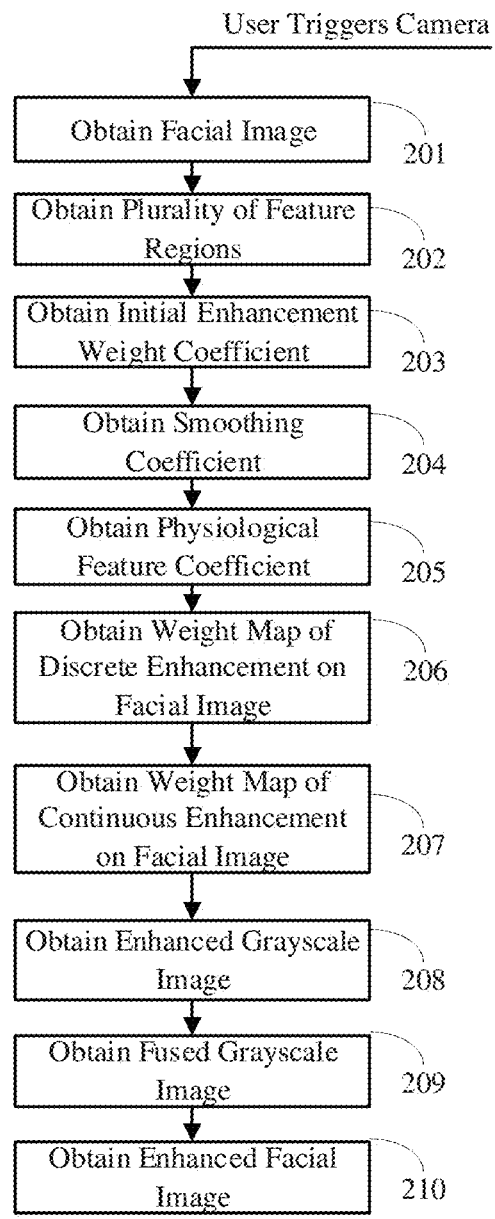
FIG. 2 is a flowchart showing a facial image enhancement method according to an exemplary embodiment.

FIG. 2 is a flowchart showing a facial image enhancement method according to an exemplary embodiment. As is shown in FIG. 2, the method may include the following steps.

In operation 201, a facial image is obtained.

In the embodiment, when a user triggers a camera module of a terminal, imaging may be performed on the terminal. For example, when the user triggers a front camera module of the terminal, the facial image may be obtained, and the facial image is an image before being processed. The facial image may also be obtained when the user triggers a rear camera module of the terminal, which is not limited in the present disclosure.

In operation 202, a plurality of feature regions in the facial image are determined.

In the embodiment, face alignment may be performed based on the CNN to obtain key feature points of a face. For example, multiple contour points of those such as eyes, nose, eyebrows, mouth, and face may be determined as key feature points, and a plurality of corresponding feature regions may be obtained based on a plurality of obtained key feature points. The feature regions may include feature regions such as an eyebrow region, a mouth region, a nose region, a cheek region, an eye region and a face contour.

In operation 203, an initial enhancement weight coefficient corresponding to each feature region is obtained.

Figure 3:
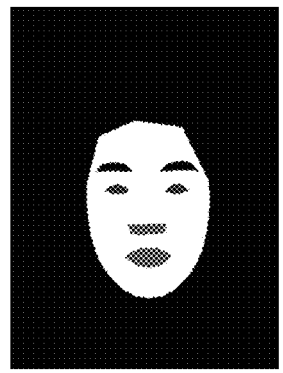
FIG. 3 is a weight map of initial enhancement on a facial image according to an exemplary embodiment.

In the embodiment, the initial enhancement weight coefficient is a preset coefficient pre-stored in an electronic device, and the preset coefficient may be obtained from experience or may be obtained by machine learning, which is not limited in this disclosure. For example, based on the initial enhancement weight coefficient obtained by machine learning and the corresponding feature regions, a weight map of each region of a face shown in FIG. 3 may be obtained.

In operation 204, a smoothing coefficient of each feature region is obtained.

In the embodiment, the smoothing coefficient of a feature region may be determined according to an average value and a variance of pixel values of a plurality of pixels in each feature region.

For example, the following formula may be used to obtain the average value of the pixel values in each feature region:

$$u = \frac{1}{n} * \sum_{k=1}^{n} x \quad \text{equation (2)}$$

where x is a pixel value in each feature region, and u is the average pixel value of each feature region.

The variance of pixel values of each feature region may be obtained by the following formula:

$$D = \frac{1}{n} * \sum_{k=1}^{n} (x - u)^2 \quad \text{equation (3)}$$

where x is a pixel value in each feature region, u is the average pixel value of each feature region, and D is the pixel variance of each feature region.

The smaller the variance of the pixel values is, the smoother the feature region is, thus the smoothing coefficient may be relatively small, so that a corrected initial weight enhancement coefficient may be made smaller later, where the smoothing coefficient may be calculated based on the variance and the average value.

In operation 205, a physiological feature coefficient of the facial image is obtained.

In the embodiment, because there are differences in facial impurity condition between older and younger users, the physiological feature coefficients may include age coefficients; and facial impurity conditions also differ when genders are different, so the physiological feature coefficients may include gender coefficients. In some embodiments, the physiological feature coefficient may include an age coefficient and a gender coefficient.

In operation 206, a weight map of discrete enhancement on the facial image is obtained according to an initial enhancement weight coefficient, the smoothing coefficient, and the physiological characteristic coefficient.

In the embodiment, assuming that the initial enhancement weight coefficient is $C_i$, the smoothing coefficient is $D_i$, the gender coefficient is A, and the age coefficient is B, then a corrected enhancement weight $E_i$ may be obtained in the following manner:

$$E_i = C_i * D_i * A * B \quad \text{equation (4)}$$

where i is an index number of each feature region.

Figure 4:
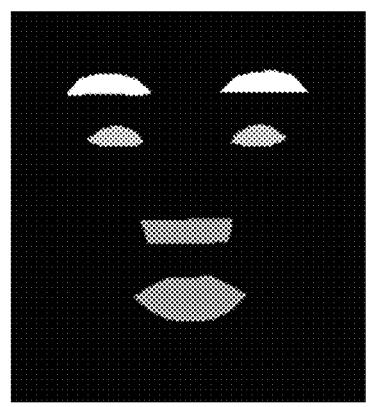
FIG. 4 is a weight map of discrete enhancement on a facial image according to an exemplary embodiment.

Based on this, the enhancement weight $E_i$ of each feature region is obtained, and the weight map M of discrete enhancement on the facial image shown in FIG. 4 may be obtained.

In operation 207, a weight map of continuous enhancement on the facial image is obtained according to the weight map of discrete enhancement on the facial image.

Figure 5:
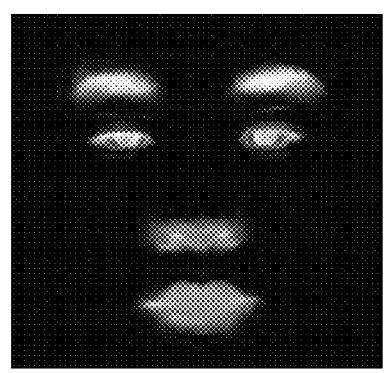
FIG. 5 is a weight map of continuous enhancement on a facial image according to an exemplary embodiment.

In the embodiment, the weight map of discrete enhancement on the facial image may be diffused into the weight map of continuous enhancement on the facial image via the guided filtering algorithm. Among that the original grayscale image Y_A of the facial image may be used as a guide image and the weight map of discrete enhancement on the facial image may be used as an input image, and thus, the weight map M of continuous enhancement on the facial image shown in FIG. 5 is obtained, which may be similar to the weight map of discrete enhancement on the facial image and has a texture equivalent to that of the original grayscale image Y_A.

In operation 208, an enhanced grayscale image is obtained based on the original grayscale image corresponding to the facial image.

In the embodiment, the original grayscale image Y_A may be enhanced via an image enhancement algorithm to obtain the enhanced grayscale image Y_B. The image enhancement algorithm may include one or more types of a high contrast preservation algorithm, a logarithmic image enhancement algorithm, an exponential image enhancement algorithm, a Laplacian operator image enhancement algorithm, and a gamma transform algorithm, which is not limited in the present disclosure. Taking the high contrast preservation algorithm as an example, the original grayscale image Y_A may be blurred by using an arbitrary Gaussian kernel to obtain a blurred image $Y\_A_1$, then, a high-frequency detail image $Y\_A_2$ is obtained based on the original grayscale image Y_A and the blurred image $Y\_A_1$, and the high-frequency detail image $Y\_A_2$ is scaled according to a preset zoom amount and accumulated in the original grayscale image Y_A to obtain an enhanced grayscale image Y_B, where the preset zoom amount may be 1.5, 2 or 2.5, which is not limited in the present disclosure.

In operation 209, a fused grayscale image is obtained according to the weight map of continuous enhancement on the facial image and the enhanced grayscale image.

In the embodiment, the fused grayscale image may be obtained according to the continuous blur amount map, the original grayscale image, and the enhanced grayscale image via the following algorithm:

$$Y\_C_{(i,j)}=M_{(i,j)}*Y\_B_{(i,j)}+(1-M_{(i,j)})*Y\_A_{(i,j)}; \quad \text{equation (5)}$$

where $Y\_C_{(i,j)}$ is a fused grayscale image of a pixel located at (i, j), $M_{(i,j)}$ is an out-of-focus weight of a pixel located at (i, j) according to the weight map of continuous enhancement on the facial image, $Y\_B_{(i,j)}$ is an enhanced grayscale image of a pixel located at (i, j), and $Y\_A_{(i,j)}$ is an original grayscale image of a pixel located at (i, j).

In operation 210, an enhanced facial image is obtained based on the fused grayscale image.

Figure 6:
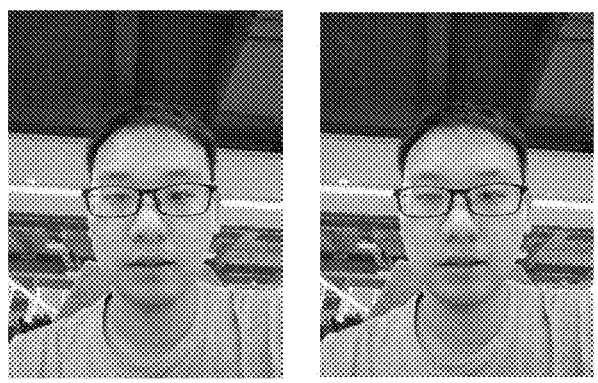
FIG. 6 is a comparison diagram showing enhancement effect of a facial image according to an exemplary embodiment.

In the embodiment, as shown in FIG. 6, the left side is the original facial image, and the right side is the enhanced facial image. Compared with the original facial image, the enhanced facial image is clearer, and facial defects are not excessively enlarged, improving the picture quality.

Corresponding to the foregoing embodiments of the facial image enhancement method, the present disclosure also provides embodiments of a facial image enhancement device.

Figure 7:
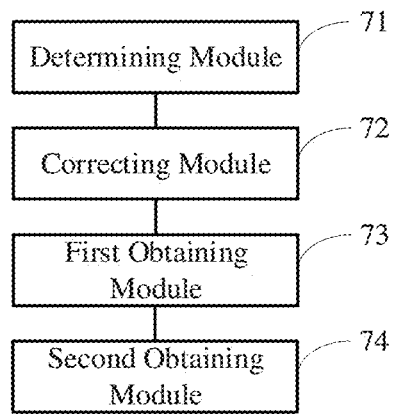
FIG. 7 is a block diagram showing a facial image enhancement device according to an exemplary embodiment.

FIG. 7 is a block diagram showing a facial image enhancement device according to an exemplary embodiment. Referring to FIG. 7, the device includes a determining module 71, a correcting module 72, a first obtaining module 73, and a second obtaining module 74.

The determining module 71 is configured to determine a plurality of feature regions in a facial image according to feature points of the facial image.

The correcting module 72 is configured to correct an initial enhancement weight coefficient of each feature region and obtain a weight map of discrete enhancement on the facial image.

The first obtaining module 73 is configured to obtain a weight map of continuous enhancement on the facial image corresponding to the facial image according to the weight map of discrete enhancement on the facial image.

The second obtaining module 74 is configured to performing enhancing the facial image according to the weight map of continuous enhancement on the facial image, and obtaining an enhanced facial image.

Figure 8:
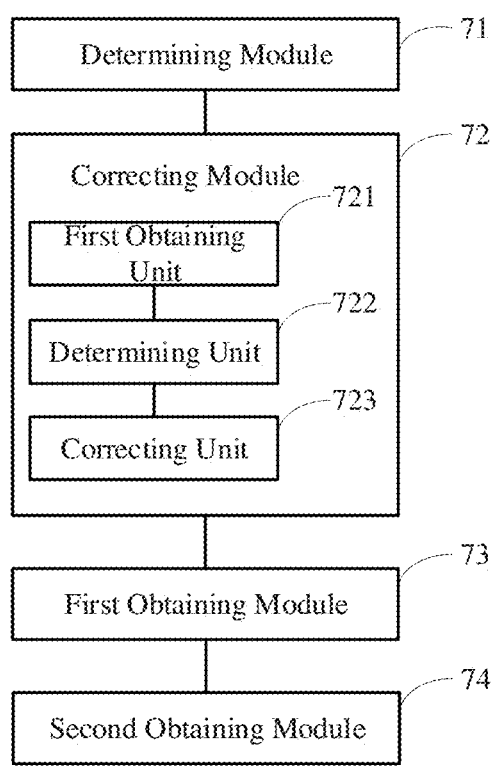
FIG. 8 is a block diagram showing a facial image enhancement device according to an exemplary embodiment.

FIG. 8 is a block diagram showing a facial image enhancement device according to an exemplary embodiment. This embodiment is based on the embodiment shown in FIG. 7. Referring to FIG. 8, the correcting module 72 includes a first obtaining unit 721, a determining unit 722, and a correcting unit 723.

The first obtaining unit 712 is configured to obtain the initial enhancement weight coefficient corresponding to each feature region.

The determining unit 722 is configured to determine a smoothing coefficient of the each feature region and a physiological feature coefficient corresponding to the facial image.

The correcting unit 723 is configured to correct the initial enhancement weight coefficient according to the smoothing coefficient of the each feature region and the physiological characteristic coefficient of the each feature region to obtain the weight map of discrete enhancement on the facial image.

In an embodiment, the physiological feature coefficient includes at least one of a gender coefficient and an age coefficient.

Figure 9:
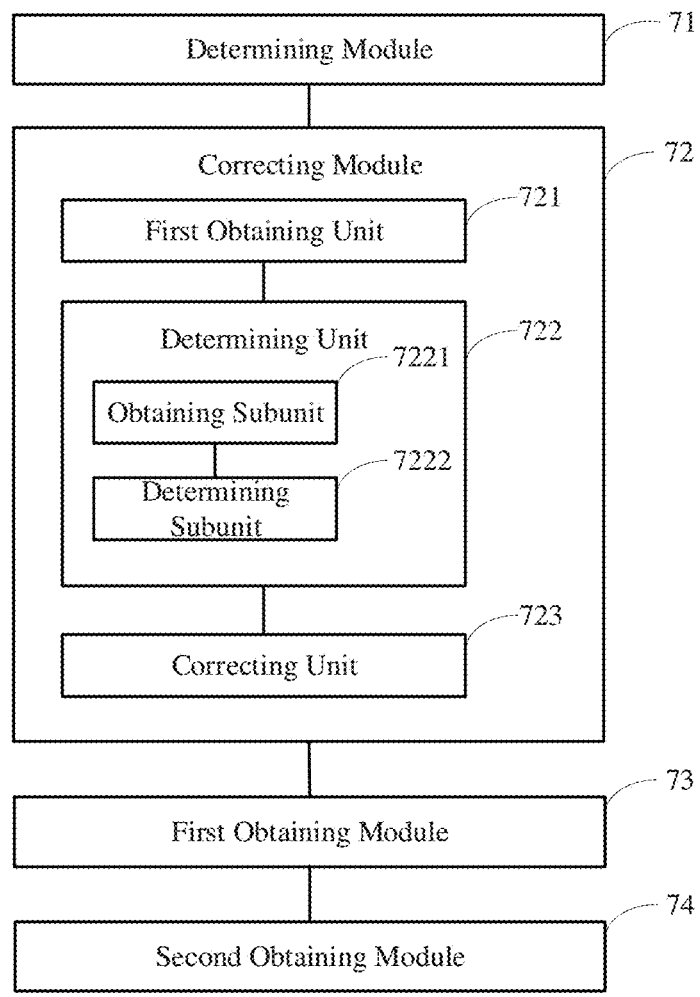
FIG. 9 is a block diagram showing a facial image enhancement device according to an exemplary embodiment.

FIG. 9 is a third block diagram showing a facial image enhancement device according to an exemplary embodiment. This embodiment is based on the embodiment shown in FIG. 8. Referring to FIG. 9, the determining unit 722 includes a obtaining subunit 7221 and a determining subunit 7222.

The obtaining subunit 7221 is configured to obtain a variance and an average value for pixel values of a plurality of pixels in the each feature region.

The determining subunit 7222 is configured to determine the smoothing coefficient according to the variance and the average value.

Figure 10:
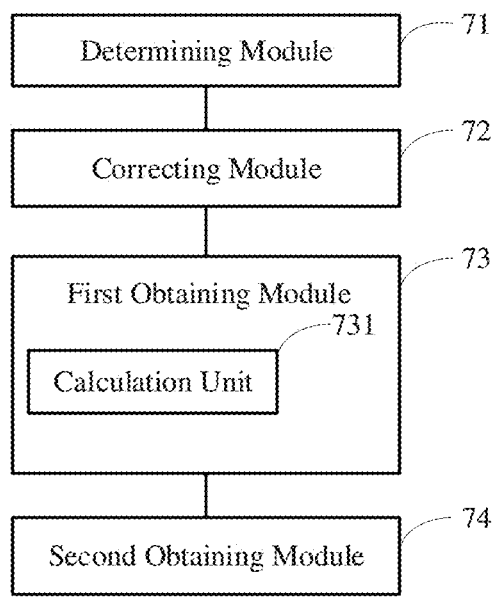
FIG. 10 is a block diagram showing a facial image enhancement device according to an exemplary embodiment.

FIG. 10 is a block diagram showing a facial image enhancement device according to an exemplary embodiment. This embodiment is based on the embodiment shown in FIG. 7. Referring to FIG. 10, the first obtaining module 73 includes: a calculation unit 731, configured to determine the weight map of continuous enhancement on the facial image according to a guided image filtering algorithm, wherein an original grayscale image corresponding to the facial image is used as a guide map in the guided image filtering algorithm, and the weight map of discrete enhancement on the facial image is used as an input image in the guided image filtering algorithm.

It should be noted that the calculation unit 731 in the device embodiment shown in FIG. 10 may also be included in the device embodiments of FIG. 8 or FIG. 9, which is not limited in the present disclosure.

Figure 11:
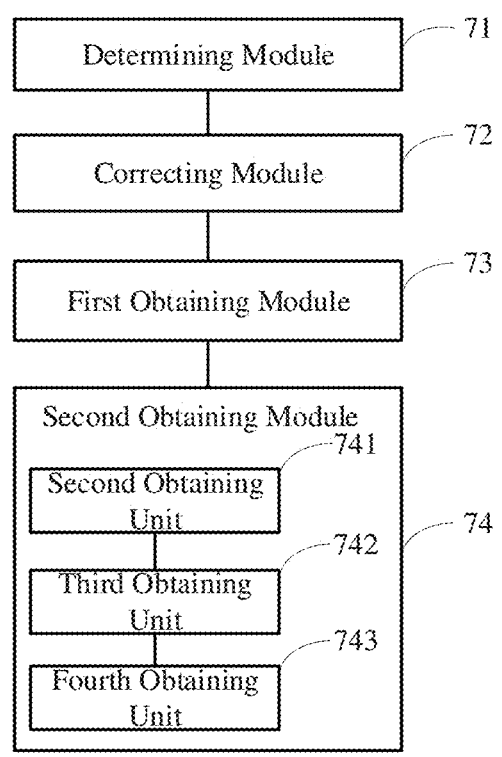
FIG. 11 is a block diagram showing a facial image enhancement device according to an exemplary embodiment.

FIG. 11 is a block diagram showing a facial image enhancement device according to an exemplary embodiment. This embodiment is based on the embodiment shown in FIG. 7. Referring to FIG. 11, the second obtaining module 74 includes a second obtaining unit 741, a third obtaining unit 742 and a fourth obtaining unit 743.

The second obtaining unit 741 is configured to perform enhancing an original grayscale image corresponding to the facial image by an image enhancement algorithm and obtain an enhanced grayscale image.

The third obtaining unit 742 is configured to obtain a fused grayscale image according to the weight map of continuous enhancement on the facial image, the original grayscale image, and the enhanced grayscale image.

The fourth obtaining unit 743 is configured to obtain the enhanced facial image according to the fused grayscale image.

It should be noted that the second obtaining unit 741, the third obtaining unit 742 and the fourth obtaining unit 743 in the device embodiment shown in FIG. 11 may also be included in the device embodiments of any one of FIG. 8 to FIG. 10, which is not limited in the present disclosure.

Figure 12:
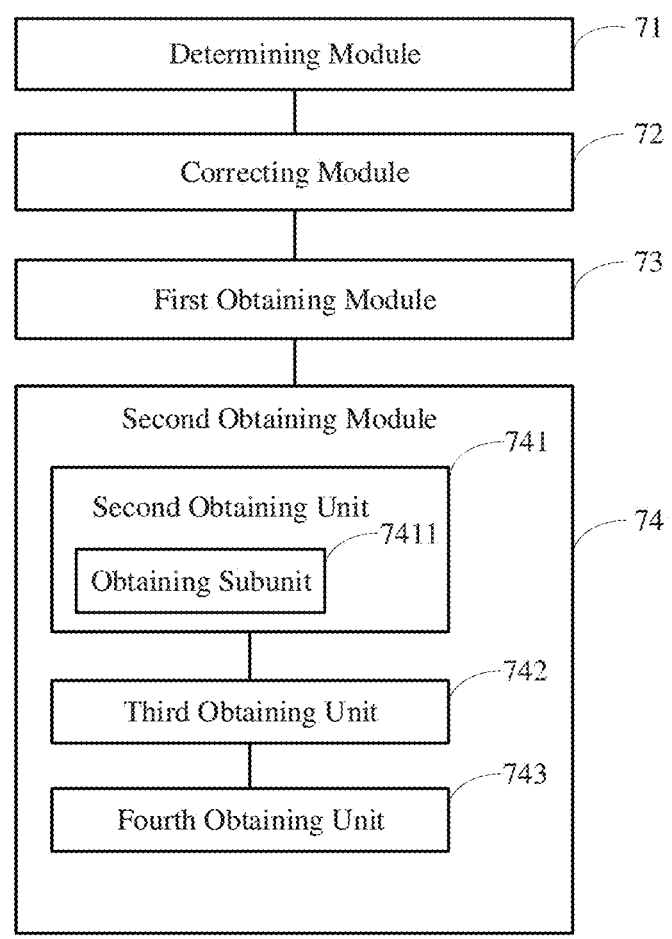
FIG. 12 is a block diagram showing a facial image enhancement device according to an exemplary embodiment.

FIG. 12 is a block diagram showing a facial image enhancement device according to an exemplary embodiment. This embodiment is based on the embodiment shown in FIG. 11. Referring to FIG. 12, the second obtaining unit 741 includes: an obtaining subunit 7411, configured to obtain the enhanced grayscale image based on a high-contrast retention algorithm and the original grayscale image.

Figure 13:
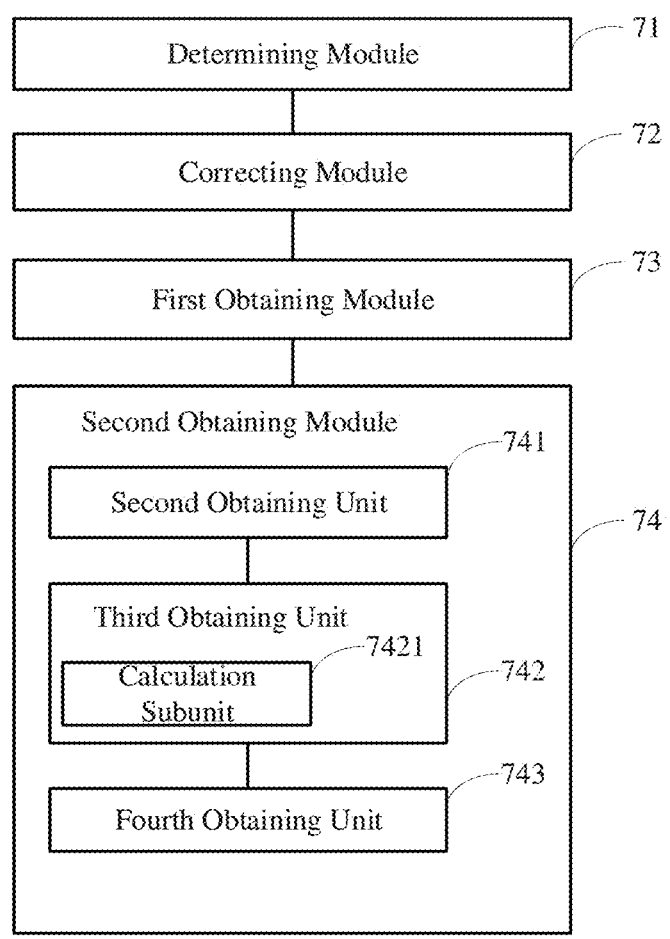
FIG. 13 is a block diagram of showing a facial image enhancement device according to an exemplary embodiment.

FIG. 13 is a block diagram showing a facial image enhancement device according to an exemplary embodiment. This embodiment is based on the embodiment shown in FIG. 11. Referring to FIG. 13, the third obtaining unit 7421 includes: a calculation subunit 7421, configured to obtain the fused grayscale image according to the following algorithm:

$$Y\_C_{(i,j)} = M_{(i,j)} * Y\_B_{(i,j)} + (1 - M_{(i,j)}) * Y\_A_{(i,j)};\qquad \text{equation (6)}$$

where Y_C is a fused grayscale image of a pixel located at (i, j), $M_{(i,j)}$ is an out-of-focus weight of a pixel located at (i, j) according to the weight map of continuous enhancement on the facial image, $Y\_B_{(i,j)}$ is an enhanced grayscale image of a pixel located at (i, j), and $Y\_A_{(i,j)}$ is an original grayscale image of a pixel located at (i, j).

It should be noted that the calculation subunit 7421 in the device embodiment shown in FIG. 13 may also be included in the device embodiment of FIG. 12 described above, which is not limited in the present disclosure.

Regarding the devices in the above embodiments, specific manners in which each module/unit performs operations have been described in detail in the embodiments of the methods, and will not be repeated here.

The device embodiments described above are only exemplary, and the modules/units described as separate components may or may not be physically separated, and the components displayed as modules/units may be located in one place, or may be distributed on a plurality of networks. Some or all of the modules/units may be selected according to actual needs.

The present disclosure also provides a facial image enhancement device, including: a processor and a memory configured to store instructions executable by the processor, wherein the processor is configured to: determine a plurality of feature regions on a facial image according to feature points of the facial image; correct an initial enhancement weight coefficient of each feature region and obtain a weight map of discrete enhancement on the facial image; obtain a weight map of continuous enhancement on the facial image according to the weight map of discrete enhancement on the facial image; and perform enhancing the facial image according to the weight map of continuous enhancement on the facial image, to obtain an enhanced facial image. For example, the facial image enhancement device may be a terminal.

The present disclosure also provides a non-transitory computer-readable storage medium having stored therein instructions that, when executed by a processor of a device, cause the device to perform: determining a plurality of feature regions on a facial image according to feature points of the facial image; correcting an initial enhancement weight coefficient of each feature region and obtain a weight map of discrete enhancement on the facial image; obtaining a weight map of continuous enhancement on the facial image according to the weight map of discrete enhancement on the facial image; and performing enhancing the facial image according to the weight map of continuous enhancement on the facial image, to obtain an enhanced facial image.

Figure 14:
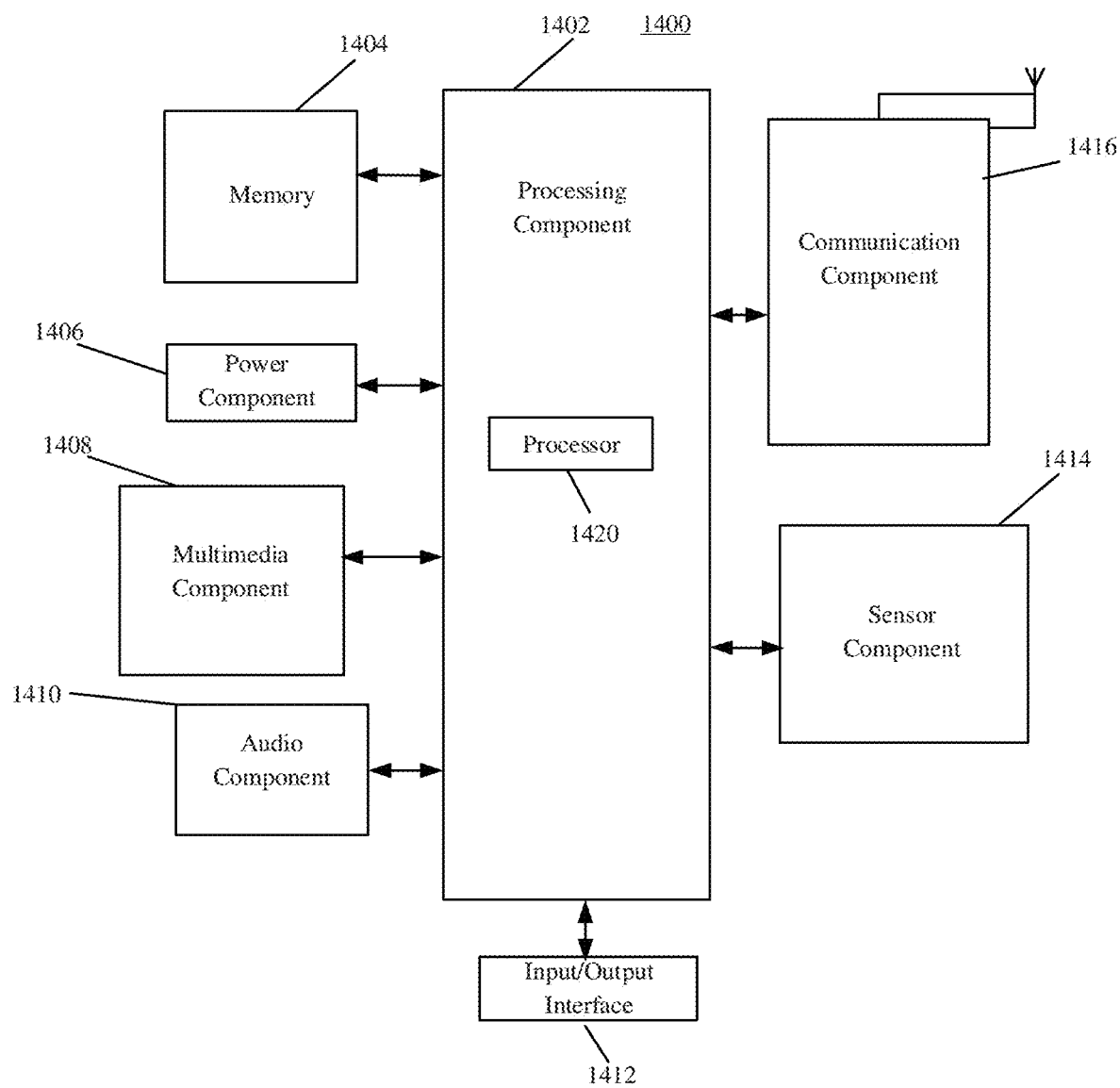
FIG. 14 is a block diagram showing a facial image enhancement device according to an exemplary embodiment.

FIG. 14 is a block diagram showing a facial image enhancement device 1400 according to an exemplary embodiment. For example, the device 1400 may be a terminal such as a mobile phone, a computer, a digital broadcast terminal, a messaging device, a game console, a tablet device, a medical device, a fitness device, a personal digital assistant, and the like.

Referring to FIG. 14, the device 1400 may include one or more of following components: a processing component 1402, a memory 1404, a power component 1406, a multimedia component 1408, an audio component 1410, an input/output (I/O) interface 1412, a sensor component 1414 and a communication component 1416.

The processing component 1402 typically controls overall operations of the device 1400, such as operation associated with display, telephone calls, data communications, camera operations and recording operations. The processing component 1402 may include one or more processors 1420 to execute instructions to perform all or part of the operations of the methods described above. Moreover, the processing component 1402 may include one or more modules to facilitate interaction between the processing component 1402 and other components. For example, the processing component 1402 may include a multimedia module to facilitate interaction between the multimedia component 1408 and the processing component 1402.

The memory 1404 is configured to store various types of data to support operations on the device 1400. Examples of such data include instructions of any application or method operated on the device 1400, including contact data, phone book data, messages, pictures, videos, and the like. The memory 1404 may be implemented by any type of volatile or non-volatile storage devices, or a combination thereof, which may be such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a disk or an optical disk.

The power component 1406 provides power to various components of the device 1400. The power component 1406 may include a power management system, one or more power sources, and other components associated with generating, managing and distributing power for the device 1400.

The multimedia component 1408 includes a screen that provides an output interface between the device 1400 and a user. In some embodiments, the screen may include a Liquid Crystal Display (LCD) and a Touch Panel (TP). If the screen includes a touch panel, the screen may be implemented as a touch screen to receive input signals from the user. The touch panel includes one or more touch sensors to sense touches, slides, and gestures on the touch panel. The touch sensor may not only sense a boundary of a touch or sliding action, but also detect duration and pressure associated with a touch or slide operation. In some embodiments, the multimedia component 1408 includes a front camera and/or a rear camera. When the device 1400 is in an operation mode, such as a shooting mode or a video mode, the front camera and/or the rear camera may receive external multimedia data. Each front camera and each rear camera may be a fixed optical lens system or have focal length and optical zoom capability.

The audio component 1410 is configured to output and/or input audio signals. For example, the audio component 1410 includes a microphone (MIC), and when the device 1400 is in an operational mode, such as a call mode, a recording mode or a voice recognition mode, the microphone is configured to receive external audio signals. The received audio signal may be further stored in the memory 1404 or sent through the communication component 1416. In some embodiments, the audio component 1410 further includes a speaker for outputting audio signals.

The I/O interface 1412 provides an interface between the processing component 1402 and a peripheral interface module which may be a keyboard, a click wheel, a button, and the like. These buttons may include, but are not limited to, a home button, a volume button, a start button and a lock button.

The sensor component 1414 includes one or more sensors for providing a status assessment of various aspects for the device 1400. For example, the sensor component 1414 may detect an open/closed state of the device 1400, a relative positioning of components, such as the display and keypad of the device 1400 The sensor component 1414 may further detect a position change of the device 1400 or one component of the device 1400, presence or absence of contact of the user with the device 1400, azimuth or acceleration/deceleration of the device 1400 and temperature changes of the device 1400. The sensor component 1414 may include a proximity sensor, configured to detect presence of nearby objects without any physical contact. The sensor component 1414 may further include a light sensor, such as a CMOS or CCD image sensor, for use in imaging applications. In some embodiments, the sensor component 1414 may further include an acceleration sensor, a gyro sensor, a magnetic sensor, a pressure sensor, or a temperature sensor.

The communication component 1416 is configured to facilitate wired or wireless communication between the device 1400 and other devices. The device 1400 may access a wireless network based on a communication standard such as WiFi, 2G, 3G, 4G LTE, 5G NR or a combination thereof. In an exemplary embodiment, the communication component 1416 receives broadcast signals or information about broadcast from an external broadcast management system through a broadcast channel. In an exemplary embodiment, the communication component 1416 further includes a Near Field Communication (NFC) module to facilitate short range communication. In an exemplary embodiment, the communication component 1416 may be implemented based on Radio Frequency Identification (RFID) technology. Infrared Data Association (IrDA) technology, Ultra-WideBand (UWB) technology, Bluetooth (BT) technology and other technologies.

In an exemplary embodiment, the device 1400 may be implemented by one or more Application Specific Integrated Circuits (ASICs), Digital Signal Processors (DSP), Digital Signal Processing Devices (DSPD), Programmable Logic Devices (PLD), Field Programmable Gate Arrays (FPGA), controllers, microcontrollers, microprocessors, or other electronic components, for performing the methods described above.

In an exemplary embodiment, there is further provided a non-transitory computer readable storage medium including instructions, such as the memory 1404 including instructions, and the instructions may be executed by the processor 1420 of the device 1400 to perform the above methods. For example, the non-transitory computer readable storage medium may be a ROM, a Random Access Memory (RAM), a CD-ROM, a magnetic tape, a floppy disk, an optical data storage device, and the like.

Other embodiments of the disclosure will be apparent to those skilled in the art after considering the specification and practicing the disclosure disclosed here. This application is intended to cover any variations, uses, or adaptations of the disclosure following general principles of the present disclosure and including such departures from the present disclosure as common sense or customary practice in the art. It is intended that the specification and implementations are considered as exemplary only, with a true scope and spirit of the disclosure being indicated by the following claims.

It will be understood that the present disclosure is not limited to the exact construction that has been described above and illustrated in the accompanying drawings, and various modifications and changes may be made without departing from the scope thereof. It is intended that the scope of the disclosure only be limited by the appended claims.

What is claimed is:

1. A facial image enhancement method, comprising:
   determining a plurality of feature regions on a facial image according to feature points of the facial image;
   correcting an initial enhancement weight coefficient of each feature region of the feature regions, and obtaining a weight map of discrete enhancement on the facial image;
   obtaining a weight map of continuous enhancement on the facial image according to the weight map of discrete enhancement on the facial image; and
   performing enhancing the facial image according to the weight map of continuous enhancement on the facial image to obtain an enhanced facial image,
   wherein the correcting the initial enhancement weight coefficient of each feature region of the feature regions, and the obtaining the weight map of discrete enhancement on the facial image comprises:
   obtaining the initial enhancement weight coefficient corresponding to each feature region of the feature regions;
   determining a smoothing coefficient of each feature region of the feature regions and a physiological feature coefficient corresponding to the facial image; and
   correcting the initial enhancement weight coefficient according to the smoothing coefficient of each feature region of the feature regions and the physiological feature coefficient, to obtain the weight map of discrete enhancement on the facial image.

2. The facial image enhancement method according to claim 1, wherein the physiological feature coefficient comprises at least one of a gender coefficient or an age coefficient.

3. The facial image enhancement method according to claim 1, wherein the determining the smoothing coefficient of each feature region of the feature regions comprises:
obtaining a variance and an average value for pixel values of a plurality of pixels in each feature region of the feature regions; and
determining the smoothing coefficient according to the variance and the average value.

4. The facial image enhancement method according to claim 1, wherein the obtaining the weight map of continuous enhancement on the facial image according to the weight map of discrete enhancement on the facial image comprises:
determining the weight map of continuous enhancement on the facial image according to a guided image filtering algorithm, wherein an original grayscale image corresponding to the facial image is used as a guide map in the guided image filtering algorithm, and the weight map of discrete enhancement on the facial image is used as an input image in the guided image filtering algorithm.

5. The facial image enhancement method according to claim 1, wherein the performing enhancing the facial image according to the weight map of continuous enhancement on the facial image to obtain an enhanced facial image comprises:
performing enhancing an original grayscale image corresponding to the facial image by an image enhancement algorithm, to obtain an enhanced grayscale image;
obtaining a fused grayscale image according to the weight map of continuous enhancement on the facial image, the original grayscale image, and the enhanced grayscale image; and
obtaining the enhanced facial image according to the fused grayscale image.

6. The facial image enhancement method according to claim 5, wherein the performing enhancing the original grayscale image corresponding to the facial image by the image enhancement algorithm, to obtain the enhanced grayscale image comprises:
obtaining the enhanced grayscale image based on a high-contrast retention algorithm and the original grayscale image.

7. The facial image enhancement method according to claim 5, wherein the obtaining the fused grayscale image according to the weight map of continuous enhancement on the facial image, the original grayscale image and the enhanced grayscale image comprises:
obtaining the fused grayscale image according to:

$$Y\_C_{(i,j)} = M_{(i,j)} * Y\_B_{(i,j)} + (1 - M_{(i,j)}) * Y\_A_{(i,j)};$$

wherein $Y\_C_{(i,j)}$ is a fused grayscale image of a pixel located at (i, j), $M_{(i,j)}$ is an out-of-focus weight of the pixel located at (i, j) obtained according to the weight map of continuous enhancement on the facial image, $Y\_B_{(i,j)}$ is an enhanced grayscale image of the pixel located at (i, j), and $Y\_A_{(i,j)}$ is an original grayscale image of the pixel located at (i, j).

8. A facial image enhancement device, comprising:
a processor; and
a memory storing instructions executable by the processor;
wherein the processor is configured to:
determine a plurality of feature regions in a facial image according to feature points of the facial image;
correct an initial enhancement weight coefficient of each feature region of the feature regions and obtain a weight map of discrete enhancement on the facial image;
obtain a weight map of continuous enhancement on the facial image according to the weight map of discrete enhancement on the facial image; and
perform enhancing the facial image according to the weight map of continuous enhancement on the facial image to obtain an enhanced facial image,
wherein in correcting the initial enhancement weight coefficient of each feature region of the feature regions and obtaining the weight map of discrete enhancement on the facial image, the processor is further configured to:
obtain the initial enhancement weight coefficient corresponding to each feature region of the feature regions;
determine a smoothing coefficient of each feature region of the feature regions and a physiological feature coefficient corresponding to the facial image; and
correct the initial enhancement weight coefficient according to the smoothing coefficient of each feature region of the feature regions and the physiological feature coefficient to obtain the weight map of discrete enhancement on the facial image.

9. The facial image enhancement device according to claim 8, wherein the physiological feature coefficient comprises at least one of a gender coefficient or an age coefficient.

10. The facial image enhancement device according to claim 8, wherein the processor is further configured to:
obtain a variance and an average value for pixel values of a plurality of pixels in each feature region of the feature regions; and
determine the smoothing coefficient according to the variance and the average value.

11. The facial image enhancement device according to claim 8, wherein the processor is further configured to:
determine the weight map of continuous enhancement on the facial image according to a guided image filtering algorithm, wherein an original grayscale image corresponding to the facial image is used as a guide map in the guided image filtering algorithm, and the weight map of discrete enhancement on the facial image is used as an input image in the guided image filtering algorithm.

12. The facial image enhancement device according to claim 8, wherein the processor is further configured to:
perform enhancing an original grayscale image corresponding to the facial image by an image enhancement algorithm, to obtain an enhanced grayscale image;
obtain a fused grayscale image according to the weight map of continuous enhancement on the facial image, the original grayscale image, and the enhanced grayscale image; and
obtain the enhanced facial image according to the fused grayscale image.

13. The facial image enhancement device according to claim 12, wherein the processor is further configured to:
obtain the enhanced grayscale image based on a high-contrast retention algorithm and the original grayscale image.

14. The facial image enhancement method according to claim 12, wherein the processor is further configured to:
obtain the fused grayscale image according to:

$$Y\_C_{(i,j)} = M_{(i,j)} * Y\_B_{(i,j)} + (1 - M_{(i,j)}) * Y\_A_{(i,j)};$$

wherein, $Y\_C_{(i,j)}$ is a fused grayscale image of a pixel located at (i, j), $M_{(i,j)}$ is an out-of-focus weight of the pixel located at (i, j) according to the weight map of continuous enhancement on the facial image, $Y\_B_{(i,j)}$ is an enhanced grayscale image of the pixel located at (i, j), and $Y\_A_{(i,j)}$ is an original grayscale image of the pixel located at (i, j).

15. A non-transitory computer-readable storage medium having stored thereon instructions that, when being executed by a processor of a device, cause the device to perform a facial image enhancement method, the method comprising:
determining a plurality of feature regions on a facial image according to feature points of the facial image;
correcting an initial enhancement weight coefficient of each feature region of the feature regions, and obtaining a weight map of discrete enhancement on the facial image;
obtaining a weight map of continuous enhancement on the facial image according to the weight map of discrete enhancement on the facial image; and
performing enhancing the facial image according to the weight map of continuous enhancement on the facial image to obtain an enhanced facial image,
wherein the correcting the initial enhancement weight coefficient of each feature region of the feature regions, and the obtaining the weight map of discrete enhancement on the facial image comprises:
obtaining the initial enhancement weight coefficient corresponding to each feature region of the feature regions;
determining a smoothing coefficient of each feature region of the feature regions and a physiological feature coefficient corresponding to the facial image; and
correcting the initial enhancement weight coefficient according to the smoothing coefficient of each feature region of the feature regions and the physiological feature coefficient, to obtain the weight map of discrete enhancement on the facial image.

* * * * *